United States Patent
Terry

(10) Patent No.: US 10,200,970 B2
(45) Date of Patent: *Feb. 5, 2019

(54) WIRELESS COMMUNICATION METHOD AND RADIO NETWORK CONTROLLER FOR COORDINATING PAGING OCCASIONS ON A COMMON PAGING CHANNEL

(71) Applicant: InterDigital Technology Corporation, Wilmington, DE (US)

(72) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,280

(22) Filed: Nov. 19, 2013

(65) Prior Publication Data

US 2014/0080496 A1    Mar. 20, 2014

Related U.S. Application Data

(63) Continuation of application No. 11/716,295, filed on Mar. 9, 2007, now Pat. No. 8,615,259, which is a continuation of application No. 10/630,892, filed on Jul. 30, 2003, now Pat. No. 7,197,323.

(60) Provisional application No. 60/400,591, filed on Aug. 1, 2002.

(51) Int. Cl.
*H04W 72/04* (2009.01)
*H04W 68/02* (2009.01)
*H04W 68/00* (2009.01)

(52) U.S. Cl.
CPC .......... *H04W 68/02* (2013.01); *H04W 68/00* (2013.01); *H04W 72/04* (2013.01); *Y02D 70/1242* (2018.01); *Y02D 70/24* (2018.01)

(58) Field of Classification Search
None
See application file for complete search history.

(56) References Cited

U.S. PATENT DOCUMENTS

| | | |
|---|---|---|
| 5,600,635 A | 2/1997 | Hamaki et al. |
| 5,909,651 A | 6/1999 | Chander et al. |
| 6,009,321 A | 12/1999 | Wang et al. |

(Continued)

FOREIGN PATENT DOCUMENTS

| | | |
|---|---|---|
| EP | 0782352 | 7/1997 |
| EP | 1213939 | 6/2002 |

(Continued)

OTHER PUBLICATIONS

IEEE Standard for Local and metropolitan area networks; Part 16: Air Interface for Fixed and Mobile Broadband Wireless Access Systems; IEEE Std 802.16/2001 (Apr. 8, 2002).

(Continued)

*Primary Examiner* — Willie J Daniel, Jr.
(74) *Attorney, Agent, or Firm* — Volpe and Koenig, P.C.

(57) ABSTRACT

A method of paging a plurality of users by synchronizing user equipment (UE) specific paging and Point-to-Multipoint (PtM) user group paging to reduce power consumption when the UE is in a discontinuous reception state. The UE identities are defined such that paging occasions and common paging channels are synchronized for multiple users within a PtM user group.

9 Claims, 2 Drawing Sheets

(56) References Cited

U.S. PATENT DOCUMENTS

| | | |
|---|---|---|
| 6,044,069 A * | 3/2000 | Wan .................. H04W 52/0216 340/7.34 |
| 6,112,055 A | 8/2000 | Bennett et al. |
| 6,122,483 A | 9/2000 | Lo |
| 6,144,653 A | 11/2000 | Persson et al. |
| 6,212,176 B1 | 4/2001 | Andersson et al. |
| 6,236,856 B1 | 5/2001 | Abbadessa |
| 6,385,450 B1 | 5/2002 | Watanabe |
| 6,400,947 B1 | 6/2002 | Bright et al. |
| 6,438,375 B1 | 8/2002 | Muller |
| 6,483,826 B1 | 11/2002 | Åkerberg |
| 6,556,820 B1 | 4/2003 | Le |
| 6,697,651 B2 | 2/2004 | Li |
| 6,728,300 B1 | 4/2004 | Sarkar et al. |
| 6,876,636 B2 | 4/2005 | Sinnarajah et al. |
| 7,127,243 B1 * | 10/2006 | Dunne et al. .............. 455/426.1 |
| 7,197,323 B2 | 3/2007 | Terry |
| 8,615,259 B2 * | 12/2013 | Terry .................. H04W 68/00 455/458 |
| 2007/0173269 A1 | 7/2007 | Laroia et al. |

FOREIGN PATENT DOCUMENTS

| | | |
|---|---|---|
| JP | 7-283781 | 10/1995 |
| JP | 2000-102053 | 4/2000 |
| JP | 2001-036457 | 2/2001 |
| JP | 2001-036959 | 2/2001 |
| JP | 2001-136159 | 5/2001 |
| WO | 92/10042 | 6/1992 |
| WO | 95/12934 | 5/1995 |
| WO | 98/25422 | 6/1998 |
| WO | 00/36869 | 6/2000 |
| WO | 00/52948 | 9/2000 |
| WO | 01/47182 | 6/2001 |
| WO | 01/76283 | 10/2001 |
| WO | 02/41649 | 5/2002 |
| WO | 04/006615 | 1/2004 |

OTHER PUBLICATIONS

Newton, "Multiplex," Newton's Telecom Dictionary, CMP Books, 18$^{th}$ ed., p. 490 (Feb. 2002).

* cited by examiner

WIRELESS COMMUNICATION METHOD AND RADIO NETWORK CONTROLLER FOR COORDINATING PAGING OCCASIONS ON A COMMON PAGING CHANNEL

CROSS REFERENCE TO RELATED APPLICATIONS

This application is a continuation of U.S. patent application Ser. No. 11/716,295, filed Mar. 9, 2007, which is a continuation of U.S. patent application Ser. No. 10/630,892, filed Jul. 30, 2003, which issued as U.S. Pat. No. 7,197,323 on Mar. 27, 2007, which claims the benefit of Provisional Application No. 60/400,591, filed on Aug. 1, 2002, which are incorporated by reference as if fully set forth.

FIELD OF INVENTION

This present invention generally relates to the field of wireless communications. More particularly, the present invention relates to providing paging services and mechanisms in cellular networks.

BACKGROUND

In conventional 3$^{rd}$ Generation (3G) Cellular Networks, Point-to-Point (PtP) and Point-to-Multipoint (PtM) paging mechanisms need to provide efficient use of radio paging resources while maintaining low User Equipment (UE) power consumption. Paging is used to establish connections and initiate transmissions. For PtP services, a paging signal that is transmitted to a UE is associated a unique identity assigned to the UE. It is expected for UEs to be in an inactive paging state for considerable time periods while awaiting paging indications. Thus, it is necessary to minimize power consumption while the UEs are in such a paging state. To accomplish this, paging occasions are predetermined in the UE and network. This allows the UE to minimize transmit and receive processing between paging occasions, which results in reduced power consumption and correspondingly increased battery life.

For PtP services, a physical paging channel and paging occasion is determined from identities unique to each UE. A motivation for using UE identities is to provide a substantially equal distribution of paging transmissions across all paging resources.

System Information Block type 5 (SIB 5) defines common channels to be employed in an "idle" mode, and SIB 6 defines common channels for a "connected" mode. In a cell, one or more Paging Transport Channels (PCHs) may be established. Each Secondary Common Control Physical Channel (SCCPCH) indicated to the UE in system information may carry up to one PCH. Thus, for each defined PCH there is one uniquely associated Page Indicator Channel (PICH) also indicated. When more than a single PCH and associated PICH are defined in SIB 5 or SIB 6, the UE selects aN SCCPCH from the ones listed in SIB 5 or SIB 6 based on an International Mobile Subscriber Identity (IMSI) as follows:

Index of selected SCCPCH=IMSI mod $K$;     Equation (1)

where K is equal to the number of listed SCCPCHs which carry a PCH (i.e., SCCPCHs carrying a Forward Access Channel (FACH) only shall not be counted). These SCCPCHs are indexed in the order of their occurrence in SIB 5 or SIB 6 from 0 to K−1.

Thus, the UE selects a physical paging channel from a list of paging channels according to a Selected Paging Channel Number as follows:

Selected Paging Channel Number=UE identity mod $K$;     Equation (2)

where K is the number of physical paging channels that exist within the cell. Equation (2) randomly distributes UEs between the paging channels.

The UE may use Discontinuous Reception (DRX) in idle mode or connected mode in order to reduce power consumption. When DRX is used, the UE needs only to monitor one Page Indicator (PI) in one Paging Occasion per DRX cycle. The UE may be attached to different Core Network (CN) domains with different CN domain specific DRX cycle lengths. The UE stores each CN domain specific DRX cycle length for each CN domain the UE is attached to and use the shortest of those DRX cycle lengths. The DRX cycle lengths to use for Universal Terrestrial Radio Access Network (UTRAN) connected mode is the shortest of the following:

(1) the UTRAN DRX cycle length; or
(2) any of the stored CN domain specific DRX cycle lengths for the CN domains the UE is only attached to with no signaling connection established.

The UE uses the IMSI, the number of available SCCPCH which carry a PCH (K), the Cell System Frame Number (SFN), Np, frame offset, Paging Block Periodicity (PBP) and the DRX cycle length to determine the paging occasions.

For Frequency Division Duplex (FDD), Np is the number of page indicators within a frame, and the frame offset is equivalent to zero. In FDD, the UE monitors its paging indicator in the PICH frame with SFN given by the Paging Occasion.

For Time Division Duplex (TDD), Np is the number of page indicators within a paging block and PICH frame offset values are given in system information. In TDD, the UE monitors its paging indicator in the paging block given by the paging occasion. The paging occasion gives the SFN of the first frame of the paging block.

The value of the Paging Occasion is determined as follows:

Paging Occasion={(IMSI div $K$)mod(DRX cycle length div PBP)}*PBP+$n$*DRX cycle length+Frame Offset;     Equation (3)

where n=0, 1, 2 . . . as long as SFN is below its maximum value. The actual Page Indicator within a Paging Occasion that the UE shall read is similarly determined based on IMSI.

The Page Indicator to use is calculated by using the following formula:

PI=DRX Index mod $Np$;     Equation (4)

where DRX Index=IMSI div 8192.

In TDD mode, the Paging Message Receiving Occasion is calculated using the following formula:

Paging Message Receiving Occasion=Paging Occasion+$N_{PICH}$+$N_{GAP}$+{(DRX Index mod $Np$)mod $N_{PCH}$}*2;     Equation (5)

where the value $N_{PICH}$ is the number of frames for PICH transmission and is equal to the PICH repetition length given in system information. The value $N_{GAP}$ is the number of frames between the last frame carrying PICH for this Paging Occasion and the first frame carrying paging messages for this Paging Occasion. The value $N_{PCH}$ is the number of Paging Groups. $N_{PCH}$ and $N_{GAP}$ are given in system information.

Thus, the UE determines the paging occasion, identified by a unique radio frame number, on the selected PICH according to:

Paging Occasion Frame Number={UE identity div $K$} mod {DRX Cycle Length}+$n$*{DRX Cycle Length};   Equation (6)

where DRX is Discontinuous Reception.

Equation (6) identifies the frame number within each DRX cycle and then for each following cycle.

In TDD systems, paging block periodicity and frame offset are also taken into account. A motivation for using UE identities is to provide an approximately even distribution of paging transmissions across all paging resources.

FIG. 1 illustrates a problem with group paging where the UE will likely have to receive separate paging occasions and physical paging channels for reception of user group and UE specific paging. In FIG. 1, "UP" 105 represents a UE specific paging occasion; "GP" 110 represents a User Group paging occasion; and "X" 115 represents UE in DRX. A more efficient method for performing group paging is desired.

SUMMARY OF THE INVENTION

The present invention defines a UE paging mechanism that synchronizes user specific and user group paging opportunities for support of broadcast and multicast services. The paging mechanism coordinates paging occasions for user specific and user group on a common paging channel. The present invention applies group paging for PtM service to similar paging channel and occasion determination logic such that the UE identity in the above Equations (2) and (6) is replaced by a common user group identity. This allows for one paging channel and set of paging occasions to be associated with a particular PtM user group. The benefit of PtM user group paging is physical resources used for paging within each cell are only required once per user group, rather than once per user in the group.

BRIEF DESCRIPTION OF THE DRAWINGS

A more detailed understanding of the invention may be had from the following description of preferred embodiments, given by way of example and to be understood in conjunction with the accompanying drawing wherein.

DETAILED DESCRIPTION

The present invention defines a UE paging mechanism in a wireless system that synchronizes user specific and user group paging opportunities by forcing a PCH and paging occasion to be at the same instance so that the users can conserve battery and so that the paging channel is used more efficiently. On the PCH are paging occasions where, for a certain paging period, the paging mechanism only has to wake up once within that period to look for a paging message. This results in a reduction of UE power consumption because the paging mechanism does not have to continuously monitor the PCH separately for the PtP and PtM paging occasions.

Hereafter, a UE is a wireless transmit/receive unit (WTRU) that includes but is not limited to a mobile station, fixed or mobile subscriber unit, pager, or any other type of device capable of operating in a wireless environment.

Figure 1:
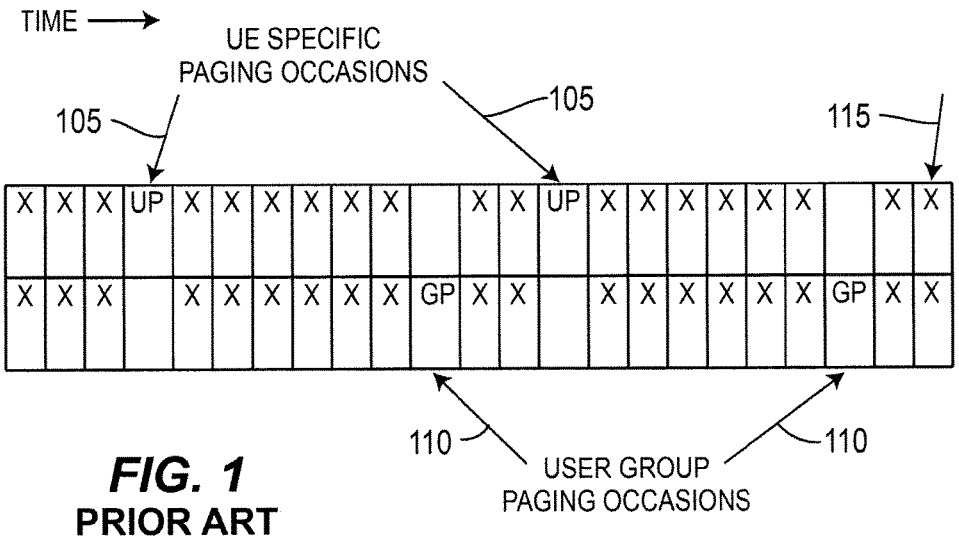
FIG. 1 is a block diagram illustrating conventional independent user specific and user group paging occasions on separate physical paging channels.
Figure 2:
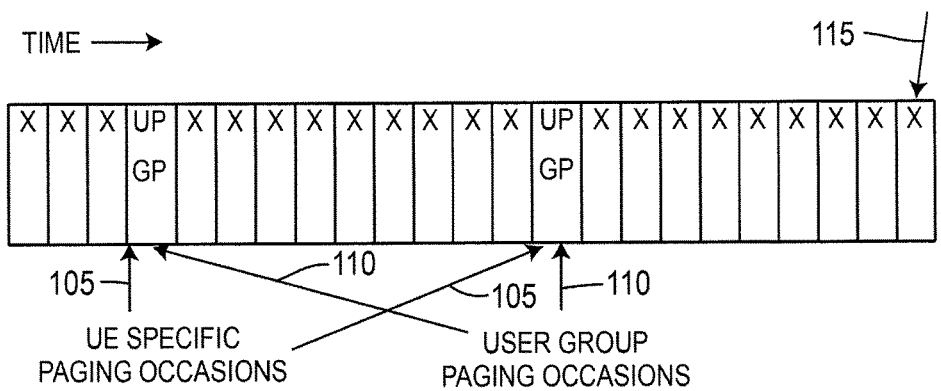
FIG. 2 is a block diagram illustrating coordinated user specific and user group paging occasions on a common paging channel in accordance with the present invention.

In accordance with the present invention, the specific channels and the paging occasions on the channels are always known by the UE and by the network. As shown in FIG. 2, there is disclosed a mechanism that coordinates paging occasions for specific users and user groups on a common paging channel. In this Figure, the terminology UP refers to a UE specific paging occasion; GP refers to a User Group paging occasion and X refers to the UE in DRX mode.

Figure 3:
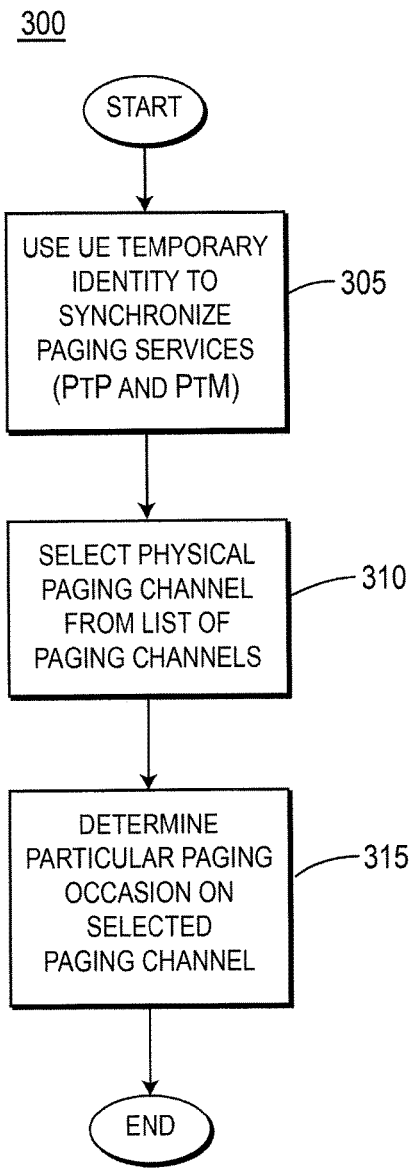
FIG. 3 is a flow chart including method steps of paging a plurality of users using a temporary identity to synchronize paging services in accordance with one embodiment of the present invention.

Referring to FIG. 3, a procedure 300 in accordance with the present invention is shown. A common identity management function, or coordination between user group and user specific identity management functions, provides identities that correlate to common paging channels and paging occasions. In accordance with the procedure 300, new temporary user specific identities are assigned upon activation of a PtM service for all UE's within a PtM user group (step 305). The temporary user specific identities correlate to the same physical paging channel and paging occasion associated with group paging.

In step 310, the UE selects a physical paging channel from a list of paging channels. The paging channel is selected according to:

Selected Paging Channel Number=UE temporary identity mod $K$;   Equation (7)

where K is the number of physical paging channels that exist within the cell.

The UE then determines the paging occasion, identified by a unique radio frame number, on the selected PICH (step 315), where:

Paging Occasion Frame Number={UE temporary identity div $K$} mod {DRX Cycle Length}+$n$*{DRX Cycle Length}.   Equation (8)

The paging channel and paging occasions may continue to be determined from the low order bits of the assigned identities. In this case, the high order bits may be used to distinguish UE specific and user group paging causes.

In accordance with the present invention, UEs have a common paging occasion for both user specific and PtM user group paging. There is no need to increase the number of paging occasions upon activation of the PtM service. Correspondingly, there is no need for an increase in power consumption upon activation of the PtM service.

Upon the occurrence of a paging occasion, the UE checks for both the UE specific paging identity and the PtM user group identity. Depending on the received identity, the type of paging is known to the UE. Alternatively, it is possible to provide a common identity and determine UE specific or PtM group paging in the associated signaled paging cause. Thus, when the UE reads on its paging occasion, it reads both the identity being paged and a paging cause, either of which may indicate the type of service (PtP or PtM).

Depending on the maximum number of users per paging occasion, it may be necessary to distribute user specific paging occasions for the user group across more than one physical paging channel and paging occasion. For large PtM user groups, several PtM identities can be provided so that individual paging occasions are not saturated. Each PtM identity is associated with a paging subgroup within the PtM user group.

A subgroup paging identity is generated for each physical paging channel and associated paging occasion required for the PtM user group. When PtM user group paging is required, each subgroup paging identity is applied to its associated paging channel and paging occasion.

As previously described, a UE identity is used for determining the paging channel and the paging occasion. The present invention provides paging for PtM services provided for a plurality of member users. Normally, these users have different paging channels and different occasions. One of the goals of the present invention is to create an even distribution of paging occasions across the PCH so that physical resources are efficiently allocated. Otherwise, if pages are not evenly distributed, there will be periods in which the PCH is not fully utilized. An excess of pages occurring during a particular paging occasion will cause a page overflow and opportunities to page the UE for the paging occasion are lost.

The user identity is used to create an even distribution. For PtM services provided for a number of users having UEs that have to wake up and recognize a page, the present invention minimizes the amount of paging. For example, if the PtM services fifty users, it would be undesirable to page all fifty of those users independently. The present invention executes one set of page occurrences generated by the network by using a single set of paging occasions that are used for waking up the UEs of the fifty users in order to receive the service.

In the preferred embodiment of the present invention, PtM services are synchronized whereby a temporary identity is used to synchronize paging occasions of both PtP and PtM services. A temporary identity is generated for each PtM and PtP service, or a common identity may be established for both (e.g., when a paging cause or some method other than "high order bits" is used to determine PtP or PtM). Only the lower order bits of the paging identity or UE identity are used to determine what the paging occasion is. The high order bits may be used to determine whether PtP or PtM services are to be used. When a UE receives a page, a match on the UE specific paging identity occurs. Thus, not only is it necessary to find a paging occasion on whatever paging channel that is assigned to the UE, but when the paging occasion is examined, a paging identity is examined that indicates whether the service is PtP or PtM by the value that is signaled at the paging identity. Alternatively, there is also a paging cause that is received along with the paging identity. The paging cause signals the user whereby a common identity is identified and the associated paging cause is examined to determine whether the service is PtP or PtM.

For a very large number of users in a PtP group (e.g., 1000 users), when the particular paging occasion is forced to align with the PtM paging occasion, too many PtP paging occasions or users may exist at the same paging occasion, resulting in the saturation of that paging occasion. Furthermore, the distribution of users across all available paging occasions is lost. Thus, it is undesirable to have all of the paging occasions for a large number of users to be focused on one paging occasion.

Figure 4:
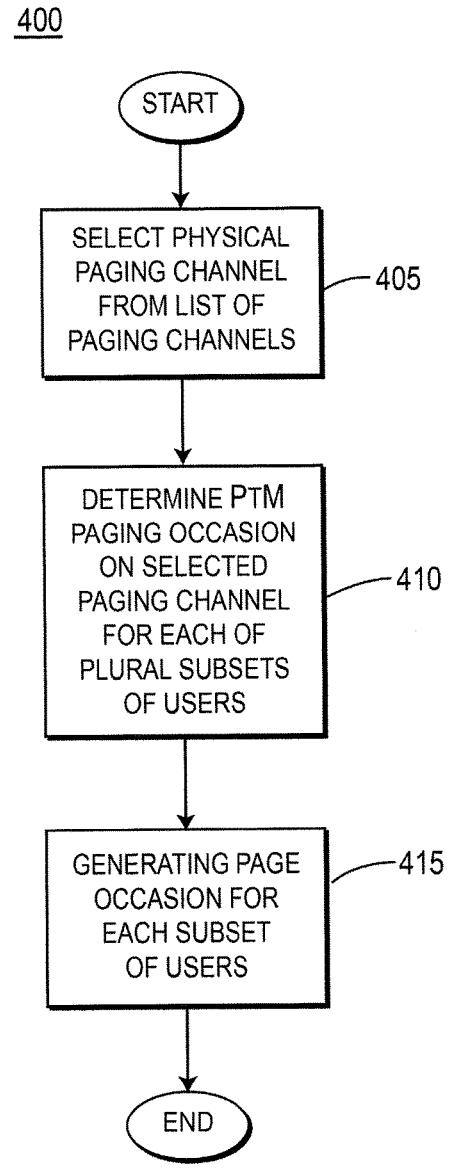
FIG. 4 is a flow chart including method steps of paging subsets of a plurality of users in accordance with another embodiment of the present invention.

Referring to FIG. 4, the UE selects a physical paging channel from a list of paging channels (step 405) in accordance with the procedure 400. The paging occasions are set by keeping track of the paging channels and paging occasion assignment logic. More than one PtM paging occasion is created for very large groups. Groups of the users that are associated with this PtM group are associated with respective ones of the PtM paging occasions. For example, if there are presently 1000 users but only a maximum of 100 of the users are permitted to be associated with any one paging occasion, 10 paging occasions having 100 users associated with each are established, so that the UEs associated with those 100 users will wake up at the time they normally would at that paging occasion and look for either the PtP or the PtM identifiers to determine what service is being initiated (step 410). It is necessary to limit the number of UEs per paging occasion because for PtP services, paging channels and paging occasions would not be evenly distributed. Of the 1000 users that are listening, groups of 100 will focus on certain paging occasions, so that when the PtM service is established, ten pages are generated, one for each group of 100 users (step 415).

Figure 5:
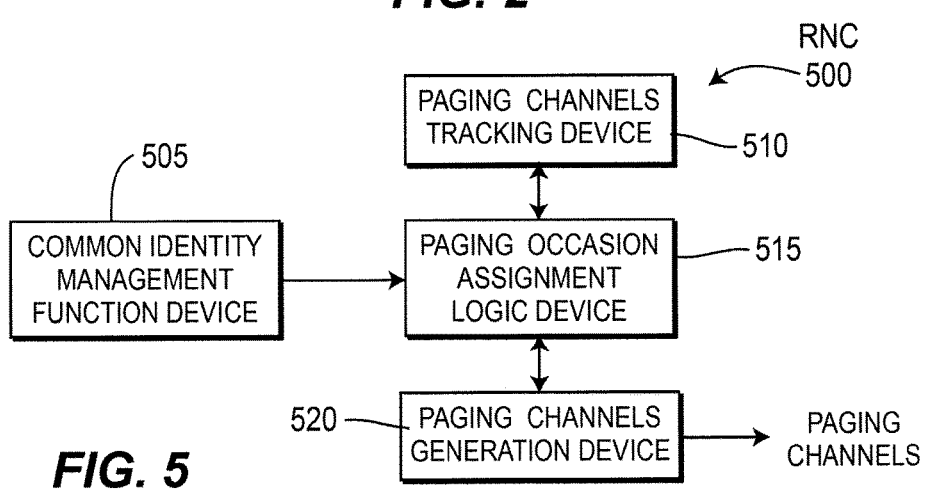
FIG. 5 is a Radio Network Controller (RNC) for coordinating user specific and user group paging occasions.

Referring to FIG. 5, a Radio Network Controller (RNC) 500 determines how the paging occasions are set by keeping track of the paging channels and paging occasion assignment logic. The RNC 500 includes a common identity management function device 505, a paging channel tracking device 510, a paging occasion assignment logic device 515 and a paging channels generation device 520. The common identity management function device 505 provides identities that correlate to common paging channels and paging occasions. The paging channel tracking device 510 sets the paging occasions by keeping track of the paging channels. The paging occasion assignment logic device 515 keeps track of the paging occasion assignment logic. The paging channels generation device 520 associates groups of the users of a PtM group with respective ones of the PtM paging occasions.

While this invention has been particularly shown and described with reference to preferred embodiments, it will be understood by those skilled in the art that various changes in form and details may be made therein without departing from the scope of the invention as described above.

What is claimed is:
1. A user equipment (UE) comprising:
a processor operatively coupled to a receiver, the processor and receiver configured to receive an assignment of a user specific identification, wherein the user specific identification is not an international mobile subscriber identity (IMSI);
the processor and receiver are further configured to monitor a first set of downlink channels for the user specific identification and a second set of downlink channels for a group identification in first time intervals, the first set of downlink channels associated with a user specific search space, wherein a monitored downlink channel associated with the user specific identification includes data specific to a user, and wherein a monitored downlink channel associated with the group identification includes data for a group of users; and
wherein the processor and receiver are further configured to perform discontinuous reception between the first time intervals and monitor for both the user specific identification and the group identification in each of the first time intervals,
wherein the processor and receiver are further configured to monitor each of the first time intervals for a plurality of group identification, wherein the processor and the receiver monitor the first time intervals in a connected mode.

2. The UE of claim 1, wherein the first set of downlink channels are paging channels.

3. The UE of claim 1, wherein the assigned user-specific identification changes.

4. A method comprising:

receiving, by a user equipment (UE), an assignment of a user specific identification, wherein the user specific identification is not an international mobile subscriber identity (IMSI); and monitoring, by the UE, a first set of downlink channels for the user specific identification and a second set of downlink channels for a group identification in first time intervals, the first set of downlink channels associated with a user specific search space, wherein a monitored downlink channel associated with the user specific identification includes data specific to a user, and wherein a monitored downlink channel associated with the group identification includes data for a group of users, wherein the UE performs discontinuous reception between the first time intervals and monitors for both the user specific identification and the group identification in each of the first time intervals, wherein the UE monitors each of the first time intervals for a plurality of group identifications, and wherein the UE monitors the first time intervals not in a connected mode.

5. The method of claim 4, wherein the first set of downlink channels are paging channel.

6. The method of claim 4, wherein the assigned user specific identification changes.

7. A wireless network device comprising:

a receiver, configured to receive an assignment of a user specific identification, wherein the user specific identification is not an international mobile subscriber identity (IMSI); and a transmitter configured to send, in a first set of downlink channels the user specific identification and in a second set of downlink channels a group identification in first time intervals, the first set of downlink channels associated with a user specific search space, wherein a monitored downlink channel associated with the user specific identification includes data specific to a user, and wherein a monitored downlink channel associated with the group identification includes data for a group of users; and wherein the receiver performs discontinuous reception between the first time intervals and monitors for both the user specific identification and the group identification in each of the first time intervals, wherein the UE monitors each of the first time intervals for a plurality of group identifications, and wherein the UE monitors the first time intervals in a connected mode.

8. The wireless network device of claim 7, wherein the first set of downlink channels are paging channels.

9. The wireless network device of claim 7, wherein the user specific identity changes.

* * * * *